US007773162B2

(12) United States Patent
Nendel

(10) Patent No.: US 7,773,162 B2
(45) Date of Patent: Aug. 10, 2010

(54) SIGNING FILM

(75) Inventor: Uwe Nendel, Hemhofen (DE)

(73) Assignee: Leonhard Kurz Stiftung & Co. KG (DE)

(*) Notice: Subject to any disclaimer, the term of this patent is extended or adjusted under 35 U.S.C. 154(b) by 339 days.

(21) Appl. No.: 11/771,100

(22) Filed: Jun. 29, 2007

(65) Prior Publication Data

US 2008/0008958 A1 Jan. 10, 2008

(30) Foreign Application Priority Data

Jul. 5, 2006 (DE) ........................ 10 2006 030 989

(51) Int. Cl.

| | |
|---|---|
| ***G02F 1/13*** | (2006.01) |
| ***G03C 1/76*** | (2006.01) |
| ***G03C 1/492*** | (2006.01) |
| ***G03C 1/494*** | (2006.01) |

(52) U.S. Cl. ........................... 349/2; 428/915; 428/917; 283/110; 359/1; 430/270.1

(58) Field of Classification Search .............. 430/270.1; 428/915, 917; 283/110; 359/1, 2

See application file for complete search history.

(56) References Cited

U.S. PATENT DOCUMENTS

| | | | | |
|---|---|---|---|---|
| 3,545,380 A | 12/1970 | Comegys et al. | | |
| 4,627,642 A | 12/1986 | Peronneau et al. | | |
| 5,438,928 A | 8/1995 | Chatwin et al. | | |
| 5,482,810 A * | 1/1996 | Nakayama et al. | .......... | 430/130 |
| 7,491,989 B2 * | 2/2009 | Loutfy et al. | ............... | 257/290 |

FOREIGN PATENT DOCUMENTS

| | | |
|---|---|---|
| DE | 2801015 | 7/1979 |
| DE | 69117756 | 7/1996 |
| EP | 0476636 A1 | 3/1992 |

* cited by examiner

*Primary Examiner*—Geraldina Visconti
(74) *Attorney, Agent, or Firm*—Hoffmann & Baron, LLP

(57) ABSTRACT

There is described a signing film wherein provided on a background of the signing film is a decorative printing which forms a security feature and which fluoresces when viewed under UV light. So that the decorative printing which fluoresces under UV light is not to be perceived when viewing the surface of the signing film at different viewing angles in ambient light, it is proposed that the background of the signing film has at least two background layers and between them the decorative printing comprising a lacquer which contains a high-viscosity binding agent and is mixed with pigments which fluoresce under UV light, so that after the printing operation and the drying operation it is of a small layer thickness as a consequence of the high viscosity.

14 Claims, No Drawings

SIGNING FILM

CROSS-REFERENCE TO RELATED APPLICATIONS

The present application claims priority to German Patent Application Number 102006030989.8-45, filed Jul. 5, 2006. This earlier filed application is incorporated herein by reference.

BACKGROUND OF THE INVENTION

The invention concerns a signing film wherein provided on a background of the signing film is a decorative printing which forms a security feature and which fluoresces when viewed under ultraviolet (UV) light.

In order to increase the forgery-proof nature of signing films, decorative printings which are referred to as logo printings and which fluoresce when viewed under UV light are applied for example to a signing area, that is to say a signature area, of the signing film. The log, that is to say decorative printing which fluoresces under UV light serves as a security feature which should not be perceptible in normal ambient light, that is to say in the visible frequency range of light.

In the case of the known signing films the decorative printing which fluoresces under UV light is applied to the background of the signing film by printing, that is to say said decorative printing is provided on the surface of the signature or signing area. When the surface of the signing area of such a known signing film is viewed in normal ambient light at different viewing angles, the decorative printing—depending on the respective viewing angle—can be perceived to a better or lesser degree. That represents a deficiency of the known signing films from security aspects.

SUMMARY OF THE INVENTION

In consideration of those factors the object of the invention is to provide a signing film of the kind set forth in the opening part of this specification, which while being of a simple structure does not suffer from the above-indicated deficiency, that is to say in which the decorative printing which fluoresces under UV light is not to be seen at different viewing angles in normal ambient light.

One aspect of the present invention involves a signing film including a background having a decorative printing forming a security feature. The decorative printing fluoresces when viewed under UV light. The background includes at least two background layers, wherein the decorative printing is arranged between the at least two background layers. The decorative printing includes a lacquer which contains a high-viscosity binding agent mixed with pigments which fluoresce under UV light. The lacquer of the decorative printing, when dried, is of a small layer thickness.

These and other objectives, features, and advantages of this invention will become apparent from the following detailed description of illustrative embodiments thereof, which is to be read in connection with the accompanying drawings.

DETAILED DESCRIPTION OF THE INVENTION

In accordance with the invention, in the case of a signing film of the kind set forth in the opening part of this specification, that object is attained in that the background of the signing film has at least two background layers and between them the decorative printing comprising a lacquer which contains a high-viscosity binding agent and is mixed with pigments which fluoresce under UV light, and which after the printing operation and the drying operation is of a small layer thickness.

In accordance with the invention the use of high-viscosity binding agents provides a lacquer having good printing viscosity, wherein the solids proportion is very small.

The lacquer is preferably a decorative lacquer. The binding agent preferably comprises polyacrylate, polyvinyl chloride, nitrocellulose, ethylhydroxyethylcellulose, ethylene-vinyl acetate terpolymer or polyesterpolyurethane; the lacquer preferably has a viscosity of between 10 and 3000 mPas (200 rpm).

The solids proportion of the lacquer used according to the invention is between 4% and 35%.

By virtue of the small solids proportion, after printing and drying of the lacquer, the decorative printing is advantageously of a very small layer thickness, that is to say the signing film according to the invention enjoys the advantage that an effect which is clearly visible under UV light is achieved with a very small layer thickness.

In the case of the signing film according to the invention the pigments of the lacquer desirably comprise fluorescing organic and inorganic pigments or thiophene-benzoaxol derivative.

The lacquer of the decorative printing after printing and drying is preferably of a layer thickness of between 0.1 μm and 6 μm.

In the signing film according to the invention the background can be of a multi-layer configuration, that is to say can comprise at least two or more layers. The fact that, in the case of the signing film according to the invention, the decorative printing which can be for example text or the like is implemented with a lacquer, as has been described hereinbefore, wherein the decorative printing is effected between two background layers of the signing film, provides that the decorative printing is very clearly perceptible under UV light. A further major advantage of the signing film according to the invention is that embedding the UV light-fluorescing decorative printing between the background layers provides a very uniformly smooth surface. When that uniformly smooth surface is viewed in ambient light at different viewing angles the UV decorative printing is not to be perceived.

While various embodiments of the present invention are specifically described herein, it will be appreciated that modifications and variations of the present invention may be effected by those skilled in the art without departing from the spirit and intended scope of the invention.

What is claimed is:

1. A signing film, comprising:

a background including a decorative printing forming a security feature, wherein the decorative printing fluoresces when viewed under UV light, the background including at least two background layers, wherein the decorative printing is arranged between the at least two background layers, the decorative printing including a lacquer which contains a high-viscosity binding agent mixed with pigments which fluoresce under UV light, the lacquer including a solids proportion between 4% and 35%, wherein the lacquer of the decorative printing, when dried, is of a layer thickness of between 0.1 μm and 6 μm.

2. A signing film as set forth in claim 1, wherein the lacquer is a decorative lacquer.

3. A signing film as set forth in claim 1, wherein the binding agent includes at least one of polyacrylate, polyvinyl chloride, nitrocellulose, ethylhydroxyethylcellulose, ethylene-vinyl acetate terpolymer and polyesterpolyurethane.

4. A signing film as set forth in claim 3, wherein the lacquer has a viscosity of between 20 and 3000 mPas (200 rpm).

5. A signing film as set forth in claim 1, wherein the pigments include fluorescing organic and inorganic pigments or a thiophene-benzoaxol derivative.

6. A signing film as set forth in claim 1, wherein the decorative printing provides a uniformly smooth surface.

7. A signing film as set forth in claim 1, wherein the decorative printing when viewed in ambient light at different viewing angles is not perceived.

8. A signing film comprising:

a background having at least two layers; and a decorative printing which forms a security feature, the decorative printing including a lacquer containing a high-viscosity binding agent mixed with pigments which fluoresce under U.V. light, wherein the lacquer includes a solids proportion between 4% and 35%, the decorative printing being arranged between the at least two layers, and further wherein the lacquer of the decorative printing, when dried, has a layer thickness of between 0.1 μm and 6 μm.

9. A signing film as set forth in claim 8, wherein the lacquer is a decorative lacquer.

10. A signing film as set forth in claim 8, wherein the binding agent includes at least one of polyacrylate, polyvinyl chloride, nitrocellulose, ethylhydroxyethylcellulose, ethylene-vinyl acetate terpolymer and polyesterpolyurethane.

11. A signing film as set forth in claim 10, wherein the lacquer has a viscosity of between 20 and 3000 mPas (200 rpm).

12. A signing film as set forth in claim 8, wherein the pigments include fluorescing organic and inorganic pigments or a thiophene-benzoaxol derivative.

13. A signing film as set forth in claim 8, wherein the decorative printing provides a uniformly smooth surface.

14. A signing film as set forth in claim 8, wherein the decorative printing when viewed in ambient light at different viewing angles is not perceived.

* * * * *